United States Patent
Kwon

(10) Patent No.: US 11,672,066 B2
(45) Date of Patent: Jun. 6, 2023

(54) PORTABLE LIGHTING DEVICE CAPABLE OF ADAPTIVE POWER SAVING AND BRIGHTNESS ADJUSTMENT

(71) Applicant: BRIGHTLAB, INC., Incheon (KR)

(72) Inventor: Tae Won Kwon, Seoul (KR)

(73) Assignee: BRIGHTLAB, INC., Incheon (KR)

( * ) Notice: Subject to any disclaimer, the term of this patent is extended or adjusted under 35 U.S.C. 154(b) by 65 days.

(21) Appl. No.: 17/090,379

(22) Filed: Nov. 5, 2020

(65) Prior Publication Data
US 2021/0059030 A1 Feb. 25, 2021

Related U.S. Application Data

(63) Continuation of application No. PCT/KR2019/000443, filed on Jan. 11, 2019.

(30) Foreign Application Priority Data

May 9, 2018 (KR) .......................... 10-2018-0053131

(51) Int. Cl.
*H05B 47/10* (2020.01)
*H05B 47/175* (2020.01)
(Continued)

(52) U.S. Cl.
CPC .............. *H05B 47/10* (2020.01); *B62J 6/029* (2020.02); *B62J 45/41* (2020.02); *B62J 45/422* (2020.02);
(Continued)

(58) Field of Classification Search
CPC ...... H05B 47/10; H05B 45/12; H05B 45/325; H05B 47/11; H05B 47/175; H05B 47/105;
(Continued)

(56) References Cited

U.S. PATENT DOCUMENTS

| 10,371,817 B2 * | 8/2019 | Sakai ..................... G01S 17/58 |
| 2011/0169411 A1 | 7/2011 | Yu et al. |

(Continued)

FOREIGN PATENT DOCUMENTS

| JP | 2020068147 A | 4/2020 |
| KR | 100273535 B1 | 1/2001 |

(Continued)

OTHER PUBLICATIONS

International Search Report of PCT/KR2019/000443 dated Apr. 29, 2019.

*Primary Examiner* — Wei (Victor) Y Chan
(74) *Attorney, Agent, or Firm* — Dinsmore & Shohl LLP

(57) ABSTRACT

According to an embodiment of the present disclosure, a portable lighting device capable of adaptive brightness control includes: a light irradiation unit that irradiates light; a brightness sensing unit that measures the brightness of a region in front of a current position at a predetermined distance; and a control unit that controls the amount of light to be irradiated by the light irradiation unit depending on the brightness measured by the brightness sensing unit. Herein, the control unit controls the amount of light by changing the width of an ON pulse period in which the light irradiation unit is operated within a discrete signal controlling the light irradiation unit or by changing the intensity of light in response to a continuous signal controlling the light irradiation unit.

6 Claims, 14 Drawing Sheets

(51) Int. Cl.
*H05B 47/11* (2020.01)
*H05B 45/325* (2020.01)
*H05B 45/12* (2020.01)
*F21L 4/00* (2006.01)
*F21V 33/00* (2006.01)
*B62J 45/41* (2020.01)
*B62J 45/422* (2020.01)
*B62J 6/029* (2020.01)
*F21W 107/13* (2018.01)
*B62J 6/028* (2020.01)

(52) U.S. Cl.
CPC ............ *F21L 4/005* (2013.01); *F21V 33/008* (2013.01); *H05B 45/12* (2020.01); *H05B 45/325* (2020.01); *H05B 47/11* (2020.01); *H05B 47/175* (2020.01); *B62J 6/028* (2020.02); *F21W 2107/13* (2018.01)

(58) Field of Classification Search
CPC ......... H05B 47/165; B62J 6/029; B62J 45/41; B62J 45/422; B62J 6/028; B62J 6/02; F21L 4/005; F21V 33/008; F21V 21/0885; F21V 23/0464; F21W 2107/13; F21Y 2115/10; Y02B 20/40
See application file for complete search history.

(56) References Cited

U.S. PATENT DOCUMENTS

| | | | | |
|---|---|---|---|---|
| 2014/0233250 | A1* | 8/2014 | Lee | B60Q 1/1423 |
| | | | | 362/465 |
| 2015/0192286 | A1* | 7/2015 | Hansen | F21L 4/027 |
| | | | | 362/373 |
| 2016/0339978 | A1* | 11/2016 | Braucht | H05B 45/10 |
| 2016/0360593 | A1* | 12/2016 | Lee | H05B 47/11 |
| 2017/0021884 | A1* | 1/2017 | Ebel | G02B 6/0006 |
| 2020/0010136 | A1* | 1/2020 | Yun | B62J 45/41 |

FOREIGN PATENT DOCUMENTS

| | | |
|---|---|---|
| KR | 20090093490 A | 2/2009 |
| KR | 100886742 B1 | 4/2009 |
| KR | 20090120615 A | 11/2009 |
| KR | 20130006965 A | 1/2013 |
| KR | 101493991 B1 | 2/2015 |
| KR | 101587963 B1 | 1/2016 |
| KR | 1020170001191 A | 1/2017 |
| KR | 1020170010292 A | 1/2017 |
| KR | 101703147 B1 | 2/2017 |
| KR | 101768409 B1 | 8/2017 |
| KR | 101845667 B1 | 4/2018 |
| KR | 20200060859 A | 6/2020 |

* cited by examiner

| MOVEMENT DISTANCE (cm) | 69 | 139 | 208 | 278 | 347 | 417 | 486 | 556 |
|---|---|---|---|---|---|---|---|---|
| STREET LAMP BRIGHTNESS (lm) | 100 | 300 | 600 | 1000 | 1100 | 1300 | 1100 | 1000 |
| BICYCLE LIGHTING BRIGHTNESS (lm) | 800 | 600 | 300 | 40 | 40 | 400 | 40 | 40 |
| BRIGHTNESS FELT BY HUMAN (lm) | 900 | 900 | 900 | 1040 | 1140 | 1300 | 1140 | 1040 |
| BATTERY SAVING (%) | 0 | 25 | 63 | 95 | 95 | 50 | 95 | 95 | ature
PORTABLE LIGHTING DEVICE CAPABLE OF ADAPTIVE POWER SAVING AND BRIGHTNESS ADJUSTMENT

CROSS-REFERENCE TO RELATED APPLICATIONS

This application is a continuation of International Application No. PCT/KR2019/000443 filed on Jan. 11, 2019 which claims priority to Korean Patent Application No. 10-2018-0053131 filed on May 9, 2018, the entire contents of which are herein incorporated by reference.

TECHNICAL FIELD

The present disclosure relates to a portable lighting device, and more particularly to a portable lighting device capable of adaptive power saving and adaptive brightness control.

BACKGROUND

As various smart mobilities have been popularized, various means of transportation have come out, and the number of people who use the means of transportation even at night continues to increase. Besides, the number of people who climb mountains or enjoy other sports at night continues to increase. In response, demand for portable lighting devices capable of assisting night activities continues to increase.

Particularly, lighting devices for bicycles are directly connected to safe bicycle driving and accessories essential to riders and more essential for night driving.

Among conventional portable lighting devices mounted on smart mobilities or bicycles, a lighting device using high power bright LEDs can ensure safety, but has a problem of rapid power consumption of batteries. Meanwhile, a lighting device using a low power dim LEDs can be used for long time, but cannot ensure safety due to dimness. This is because conventional lighting devices irradiate a uniform amount of light regardless of whether the ambient light is bright or dim. For example, if a rider rides a bicycle at night on a road installed with street lamps, the street lamps are installed apart from each other, and, thus, it is the brightest right under the street lamps but relatively dark between the street lamps. Therefore, when a rider rides a bicycle on a road at night, he/she alternately passes through bright zones and dark zones. In spite of driving in such a night environment of non-uniform illuminance, conventional bicycle lighting devices need to continuously consume and waste power to maintain uniform brightness in both bright zones and dark zones.

As a result, the conventional portable lighting devices are limited in both the amount of light to be irradiated and the duration of light irradiation.

SUMMARY

Problems to be Solved by the Invention

An object of the present disclosure is to save a battery of a portable lighting device by adaptively controlling brightness to irradiate bright light in a dark place and reduce the intensity of light in a bright place.

Another object of the present disclosure is to appropriately control the brightness of a lighting device according to the direction of movement even during high speed exercise such as bicycle riding by measuring the brightness of a region in front of a user at a certain distance from the user and controlling the lighting device based thereon.

Means for Solving the Problems

According to an embodiment of the present disclosure, a portable lighting device capable of adaptive brightness control includes: a light irradiation unit that irradiates light; a brightness sensing unit that measures the brightness of a region in front of a current position at a predetermined distance; and a control unit that controls the amount of light to be irradiated by the light irradiation unit depending on the brightness measured by the brightness sensing unit. Herein, the control unit controls the amount of light by changing the width of an ON pulse period in which the light irradiation unit is operated within a discrete signal controlling the light irradiation unit or by changing the intensity of light in response to a continuous signal controlling the light irradiation unit.

Further, the lighting device may reduce the amount of light as the measured brightness increases and increase the amount of light as the measured brightness decreases to control the brightness to be maintained in a predetermined range.

Furthermore, the control unit may perform a control based on pulse width modulation (PWM) and control the brightness sensing unit to measure the brightness in an OFF pulse period in which the light irradiation unit is not operated.

Moreover, the control unit may perform a control to measure the brightness for each OFF pulse period and determine a pulse width of a next ON pulse period depending on the measured brightness.

Besides, according to an embodiment of the present disclosure, the lighting device may further include a speed sensing unit that senses a movement speed of the lighting device, and the control unit may control the width or frequency of the ON pulse period to be different from that of the OFF pulse period depending on the movement speed.

Also, the control unit may control a frequency of a control signal based on the PWM to be higher than a frequency which is recognizable by a human.

Further, the brightness sensing unit may measure the luminance.

Furthermore, the brightness sensing unit may include a pinhole type lens that collects light generated in front thereof.

Moreover, the light irradiation unit may include an upward light and a downward light placed vertically and may be configured to operate a light irradiation unit of any one of the upward light and the downward light, and the brightness sensing unit may be placed between the upward light and the downward light.

Besides, a recognition region in front from which the brightness sensing unit recognizes light and a light output region to which the light irradiation unit irradiates light may be overlapped with each other.

Also, a recognition region in front from which the brightness sensing unit recognizes light may be placed farther from the lighting device than a light output region to which the light irradiation unit irradiates light.

According to an embodiment of the present disclosure, the lighting device may further include a detachable unit that is detachable from a user's body or a separate means of transportation.

According to an embodiment of the present disclosure, the lighting device may further include a communication unit that performs local area communication with another device, and the control unit may control the light irradiation unit to irradiate light when a signal indicating that a predetermined device has been recognized at a short range is received from the communication unit.

Moreover, the control unit may collect estimated driving time information of a user from a user device and then control the amount of light from the light irradiation unit depending on remaining power and the estimated driving time information.

Besides, the control unit may perform a control based on pulse width modulation (PWM) and control the brightness sensing unit to measure the brightness in an OFF pulse period when an OFF delay time elapses after the light irradiation unit turns off, and controls the amount of light by changing the width of the ON pulse period in which the light irradiation unit is operated within the discrete signal controlling the light irradiation unit, and the brightness sensing unit may have a structure including a hole part that collects light generated in front thereof to measure the luminance representing the amount of light reflected from a target surface and a passage extending from the hole part and configured to filter noise light from the generated light and collect long-range light at a wide angle by means of a lens.

According to another embodiment of the present disclosure, a method for adaptively controlling the brightness of a lighting device includes: a process for measuring the brightness of a region in front of a current position at a predetermined distance by means of a brightness sensing unit of the lighting device; a process for determining the amount of light to be irradiated by a light irradiation unit of the lighting device depending on the measured brightness; and a process for controlling the light irradiation unit of the lighting device depending on the determined amount of light, and the process for determining the amount of light by changing the width of an ON pulse period in which the light irradiation unit is operated within a discrete signal controlling the light irradiation unit or by changing the intensity of light in response to a continuous signal controlling the light irradiation unit.

Effects of the Invention

A conventional portable lighting device is equipped with a light irradiation unit only, whereas an embodiment of the present disclosure is equipped with a brightness sensing unit and a control unit and thus can perform an adaptive brightness control.

According to an embodiment of the present disclosure, the amount of light is controlled by adjusting the width of an ON pulse period in which the lighting device is operated based on PWM, and, thus, a small amount of light is output on a bright driving road and a large amount of light is output on a dark driving road to save a battery.

Also, even when the amount of light of the lighting device changes, a user can recognize the ambient light and the light from the lighting device, and, thus, the brightness that the user can see can be maintained at a certain level. Therefore, the safety and visibility of the user can be secured.

Further, a conventional technique is configured to control the brightness of a lighting device by measuring the illuminance at a current position, and, thus, the illuminance is measured with consideration of light irradiated at the current position from the lighting device. Therefore, it is difficult to perform a precise light control with consideration of the actual ambient light. However, according to an embodiment of the present disclosure, the luminance of a region in front of a current position at a certain distance is measured, and, thus, the actual ambient light level can be measured precisely without consideration of light irradiated at the current position from the lighting device. Also, it is possible to perform a precise light control based on the measured ambient light level.

A portable lighting device according to another embodiment of the present disclosure may include: a main body case; a light source unit that is placed on the front of the main body case and configured to irradiate a light source in a forward direction; a pinhole unit that is placed on the back of the light source unit and includes, at the center, a pinhole for collecting light generated in front thereof; and a sensor unit that is placed on the back of the pinhole unit and includes an illuminance sensor for receiving the light collected by the pinhole unit.

Also, the portable lighting device may further include, on the back of the main body case, a fixing unit capable of fixing the main body case.

Further, the pinhole unit may be formed into a plate shape and includes the pinhole having a cylindrical shape and penetrating the center of the pinhole unit in the forward direction, and the pinhole unit and a front fixing pin for fixing the light source unit may protrude in the forward direction and the sensor unit and a back fixing pin for fixing may protrude in a backward direction.

Furthermore, the light source unit may be formed into a plate shape and includes a hole corresponding in size to the pinhole and penetrating the center of the plate and grooves corresponding in position and size to the front fixing pin at both side parts, respectively.

Moreover, the light source unit may include an upward light source and a downward light source configured to irradiate light in the forward direction and placed vertically with respect to the hole at the center of the light source unit, and a light irradiation unit of any one of the upward light source or the downward light source is operated.

Besides, the sensor unit may be formed into a plate shape and may include a sensor corresponding in position to the center of the pinhole unit and a hole corresponding in size to the back fixing pin of the pinhole unit and in position to the center of the pinhole unit.

Also, a region to which the light irradiation unit irradiates light and a recognition region formed in front by the pinhole may be overlapped with each other.

Further, the illuminance sensor provided in the sensor unit may be placed at a position corresponding to the center of the pinhole to measure the luminance.

The portable lighting device may further include a lens unit placed on the front of the pinhole unit and including a lens corresponding in position to the pinhole.

Furthermore, the lens placed in the lens unit may be any one of lenses including a condensing lens and a pinhole type lens.

DETAILED DESCRIPTION

Figure 1:
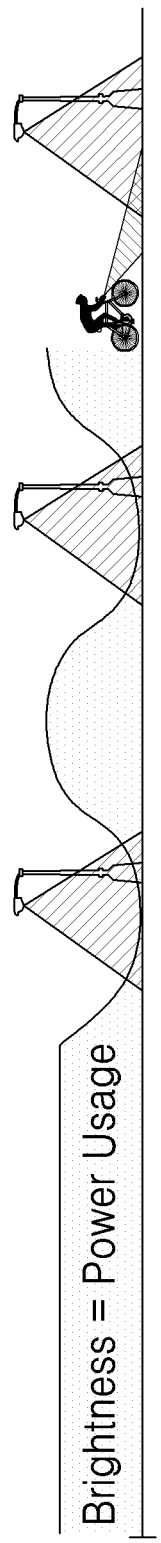
FIG. 1 is a conceptual diagram provided to explain a function of an embodiment of the present disclosure.

Hereafter, embodiments will be described in detail with reference to the accompanying drawings so that the present disclosure may be readily implemented by a person with ordinary skill in the art. However, it is to be noted that the present disclosure is not limited to the embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected to" another element and an element being "electronically connected to" another element via another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Throughout the whole document, the term "unit" includes a unit implemented by hardware or software and a unit implemented by both of them. One unit may be implemented by two or more pieces of hardware, and two or more units may be implemented by one piece of hardware. However, the "unit" is not limited to the software or the hardware, and the "unit" may be stored in an addressable storage medium or may be configured to implement one or more processors. Accordingly, the "unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components or "units" and functions thereof can be combined with each other or can be divided up into additional components or "units". Further, the components and the "units" may be configured to implement one or more CPUs in a device or a secure multimedia card.

The term "device" to be described below may be implemented with computers or portable devices which can access a server or another device through a network. Herein, the computers may include, for example, a notebook, a desktop, a laptop, and a VR HMD (e.g., HTC VIVE, Oculus Rift, GearVR, DayDream, PSVR, etc.) equipped with a WEB browser. Herein, the VR HMD includes all of models for PC (e.g., HTC VIVE, Oculus Rift, FOVE, Deepon, etc.), mobile (e.g., GearVR, DayDream, Baofeng Mojing, Google Cardboard, etc.) and console (PSVR), and stand-alone models (e.g., Deepon, PICO, etc.). The portable devices are, for example, wireless communication devices that ensure portability and mobility and may include a smart phone, a tablet PC, a wearable device and various kinds of devices equipped with a communication module such as Bluetooth (BLE, Bluetooth Low Energy), NFC, RFID, ultrasonic waves, infrared rays, WiFi, LiFi, and the like. Further, the term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

Referring to FIG. 1, a portable lighting device 100 according to an embodiment of the present disclosure may adaptatively control the amount of light to be irradiated by the lighting device 100 depending on the ambient light.

Specifically, if a number of street lamps are spaced apart from each other, it is bright under the street lamps and it is dark between the street lamps. Here, the portable lighting device 100 according to an embodiment of the present disclosure may reduce the amount of light as the measured brightness increases and increase the amount of light as the measured brightness decreases to control the brightness to be maintained in a predetermined range. Thus, the lighting device 100 according to an embodiment of the present disclosure can save a battery.

Figure 2:
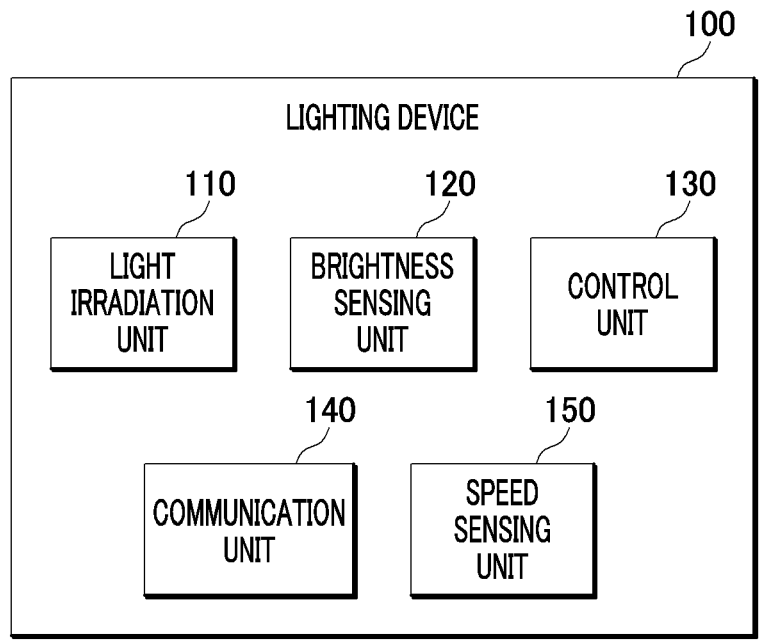
FIG. 2 is a block diagram illustrating the configuration of a lighting device according to an embodiment of the present disclosure.

The structure of the lighting device 100 according to an embodiment of the present disclosure will be described in detail with reference to FIG. 2.

The lighting device 100 according to an embodiment of the present disclosure includes a light irradiation unit 110, a brightness sensing unit 120, a control unit 130, a communication unit 140 and a speed sensing unit 150.

The light irradiation unit 110 is a light source that irradiates light. For example, the light irradiation unit 110 may be an LED or the like, but may be any one of various other light sources. However, the present disclosure is not limited to the example.

The brightness sensing unit 120 may measure the brightness of a region in front of a current position at a predetermined distance. The brightness sensing unit 120 corresponds to a brightness measurement sensor. Further, the brightness sensing unit 120 according to an embodiment of the present disclosure is configured not to sense the brightness of the current position but to sense the region in front of the current position at a predetermined distance. When a light source is operated at night, the ambient light level of the current position is measured with consideration of the amount of light irradiated by the light source as well as the actual amount of light at night. Therefore, it is difficult to recognize how dark it is. However, if the brightness of the region in front is measured according to an embodiment of the present disclosure, it is possible to precisely measure how dark it is actually with almost no consideration of the amount of light irradiated by the light source.

Also, the brightness sensing unit 120 may measure the luminance. The term "illuminance" refers to the amount of light incident on a target surface and may be expressed in lx or lux. The term "luminance" refers to the amount of light reflected from the target surface and may be expressed in $cd/m^2$. Conventional general techniques use an illuminance sensor for measuring the illuminance, but an embodiment of the present disclosure measures the luminance. The luminance is the overall impression of a space and an effective measurement unit for evaluating the brightness.

Figure 3:
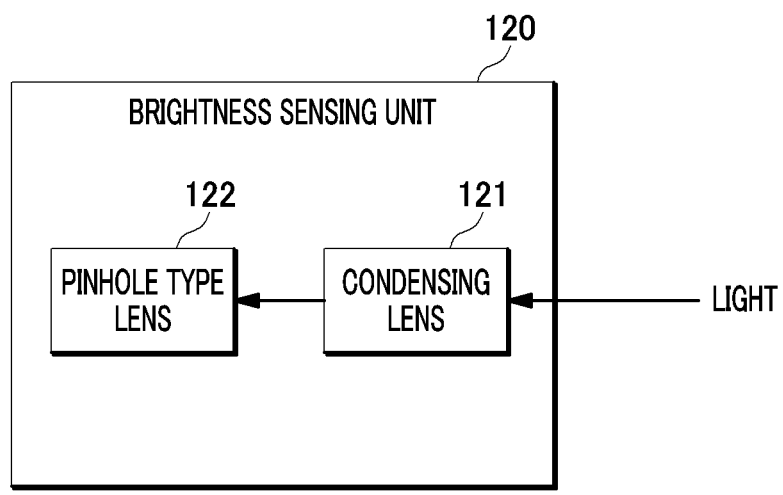
FIG. 3 is a block diagram illustrating the configuration of a brightness sensing unit according to an embodiment of the present disclosure.

To precisely measure the brightness, the brightness sensing unit 120 may have a structure as shown in FIG. 3. Referring to FIG. 3, the brightness sensing unit 120 may include at least one of a condensing lens 121 and a pinhole type lens 122. The condensing lens 121 may intensively collect light generated in front thereof. That is, the condensing lens 121 may amplify and collect the amount of light to collect more light when light is insufficient. The pinhole type lens 122 may collect the amount of long-range light at a wide angle. Therefore, the pinhole type lens 122 is a very suitable component for measuring the luminance. The pinhole type lens 122 may collect the amount of long-range light from a precise point at a wide angle. The pinhole type lens 122 may be configured to have the same structure as a pinhole lens or may be configured such that a hole of the pinhole lens through which light is induced has an internally extended passage like a drinking straw to suppress collection of other noise light.

Figure 4:
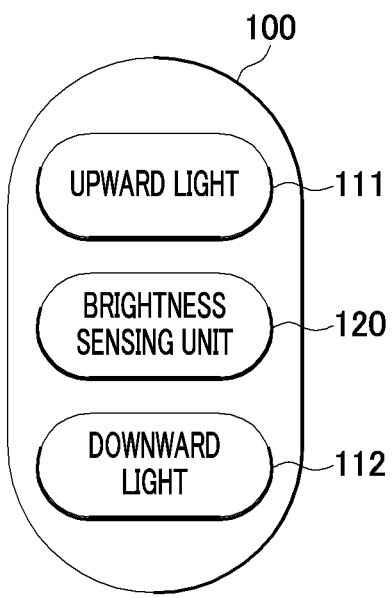
FIG. 4 is a diagram illustrating the placement between a light irradiation unit and a brightness sensing unit of the lighting device according to an embodiment of the present disclosure.

Further, the brightness sensing unit 120 may be placed between a plurality of light sources to precisely measure light without interference from the light irradiation unit 110. For example, referring to FIG. 4, if the light irradiation unit 110 is composed of an upward light 111 on the upper side and a downward light 112 on the lower side, the brightness sensing unit 120 may be placed between the upward light 111 and the downward light 112.

Here, the light irradiation unit 110 controls the upward light 111 or the downward light 112 and may select the upward light 111 or the downward light 112 in response to an input based on button manipulation of the user or may automatically select the upward light 111 or the downward light 112 depending on the ambient light level recognized by the brightness sensing unit 120.

The control unit 130 controls the amount of light to be irradiated by the light irradiation unit 110 depending on the brightness measured by the brightness sensing unit 120.

The control unit 130 can control the light irradiation unit 110 in two ways.

First, the control unit 130 can perform a control based on pulse width modulation (PWM). A control signal based on the PWM is a discrete signal. That is, the control signal may be composed by repeating a signal in an ON pulse period in which the light irradiation unit 110 is operated and a signal in an OFF pulse period in which the operation of the light irradiation unit 110 is stopped.

Figure 5:
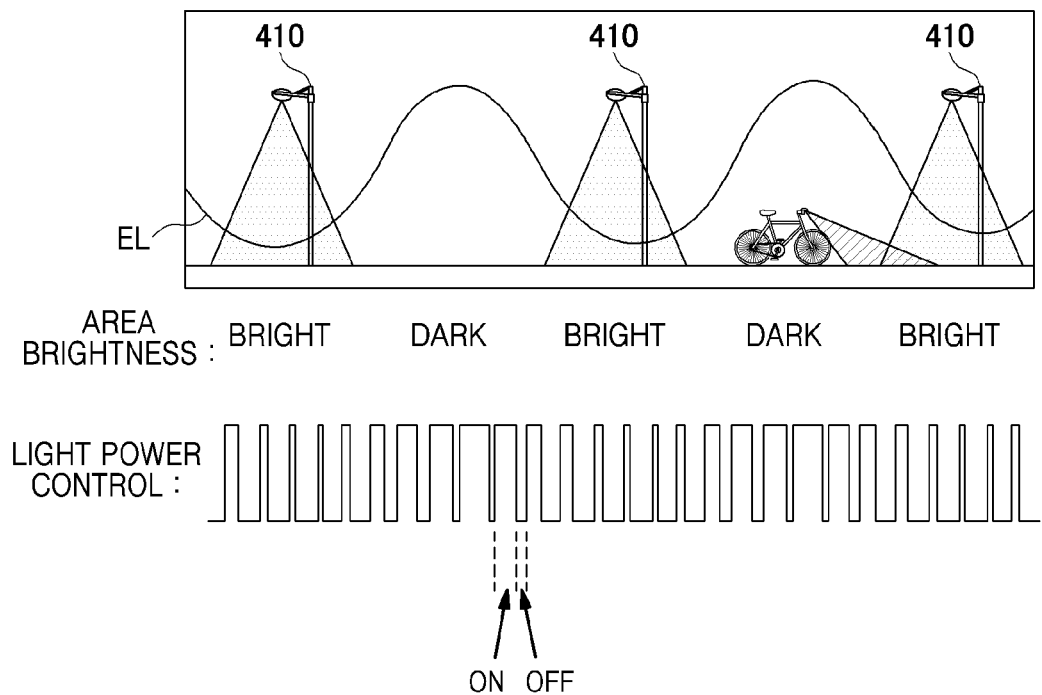
FIG. 5 is a conceptual diagram provided to explain a pulse width modulation (PWM) control method according to an embodiment of the present disclosure.

The control unit 130 may control the brightness sensing unit 120 to measure the brightness for each OFF pulse period and control the amount of light by controlling the width of a next ON pulse period based on the measured brightness. Referring to FIG. 5, a first street lamp 410, a second street lamp 420 and a third street lamp 430 are installed on a road at a predetermined distance from each other and are all turned on. A bicycle is moving on the road installed with the first street lamp 410, the second street lamp 420 and the third street lamp 430. Here, it can be seen that in a bright region under a street lamp, the width of an ON pulse period of a control signal of the lighting device 100 decreases, but the width of an OFF pulse period increases, and in a dark region between street lamps, the width of an ON pulse period of the control signal increases, but the width of an OFF pulse period decreases. Here, it can be seen that the illuminance of light irradiated by the lighting device is high in the dark region and low in the bright region as indicated by EL in FIG. 5.

Here, a frequency of the control signal is set to be higher than a frequency (e.g., 60 Hz) which is recognizable by a human, and, thus, the user may not recognize the flicker of the light irradiation unit 110.

Meanwhile, if the user riding a bicycle moves at a high speed, the luminance of a region in front thereof needs to be recognized at a short cycle. Therefore, the width or frequency of the ON pulse period needs to be controlled differently from that of the OFF pulse period depending on the movement speed. In an additional embodiment, the present disclosure may further include a speed sensing unit that senses a movement speed of the lighting device 100. In this case, the control unit 130 may control a frequency of the control signal with consideration of the movement speed of the lighting device 100 and the brightness measured by the brightness sensing unit 120.

Also, the control unit 130 may control the amount of light by controlling the light source based on a continuous signal and changing the intensity of light. For example, the control unit 130 may use a light source, such as an LED which has been widely used, and control the intensity of light to be increased when it is dark and to be decreased when it is bright depending on the ambient light.

Figure 6A:
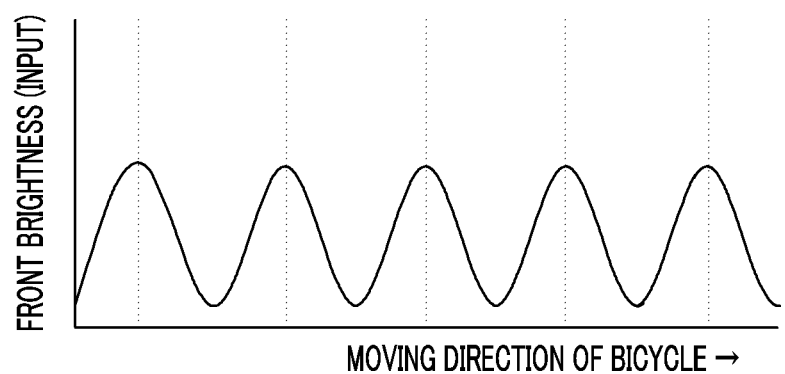
FIG. 6A is a graph of brightness sensed along a moving direction of a user.
Figure 6B:
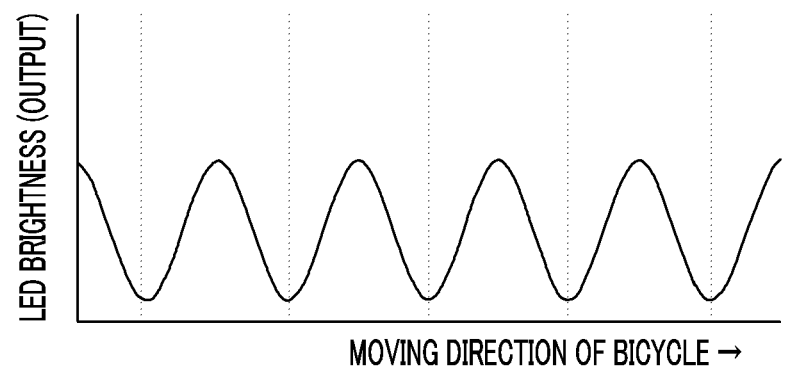
FIG. 6B is a graph of brightness of light output from a light irradiation unit along the moving direction of the user.
Figures 6C, 7:
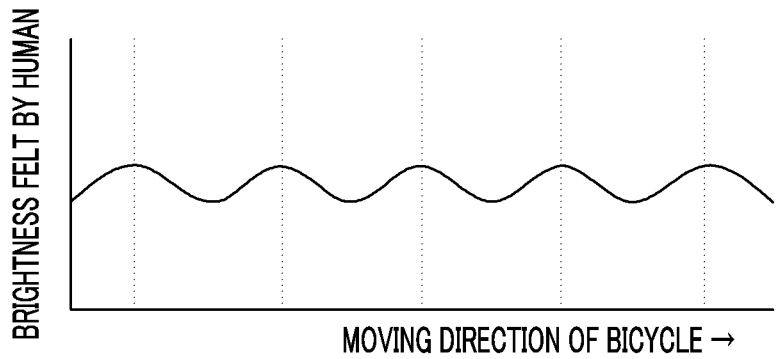
FIG. 6C is a graph of brightness felt by the user along the moving direction of the user.
FIG. 7 is a table of ambient light, brightness of light and level of battery saving depending on a movement distance.

According to this control method, if the brightness of a region in front recognized by the brightness sensing unit 120 shows a cyclic Gauss curve as in a graph of FIG. 6A, the amount of light output by the light irradiation unit 110 may show the inversion of the Gauss curve of FIG. 6A as in a graph of FIG. 6B. The actual amount of light fluctuates widely as shown in FIG. 6B, but fluctuates depending on the ambient light level. Therefore, the brightness felt by the user may not greatly change within a predetermined range as shown in FIG. 6C. That is, the user cannot feel darkness of the surrounding environment on the move. Therefore, the user may hardly feel eye fatigue.

Also, a table in FIG. 7 shows the relationship between the brightness of light measured when the user rides a bicycle at night, the brightness of light output from the lighting device and a battery. Referring to FIG. 7, it can be seen that the brightness of a lighting device of the bicycle fluctuates when the bicycle passes by street lamps as a movement distance increases as described above. Here, it can be seen that the percentage of battery saving increases whenever the brightness of the lighting device decreases.

Figure 8:
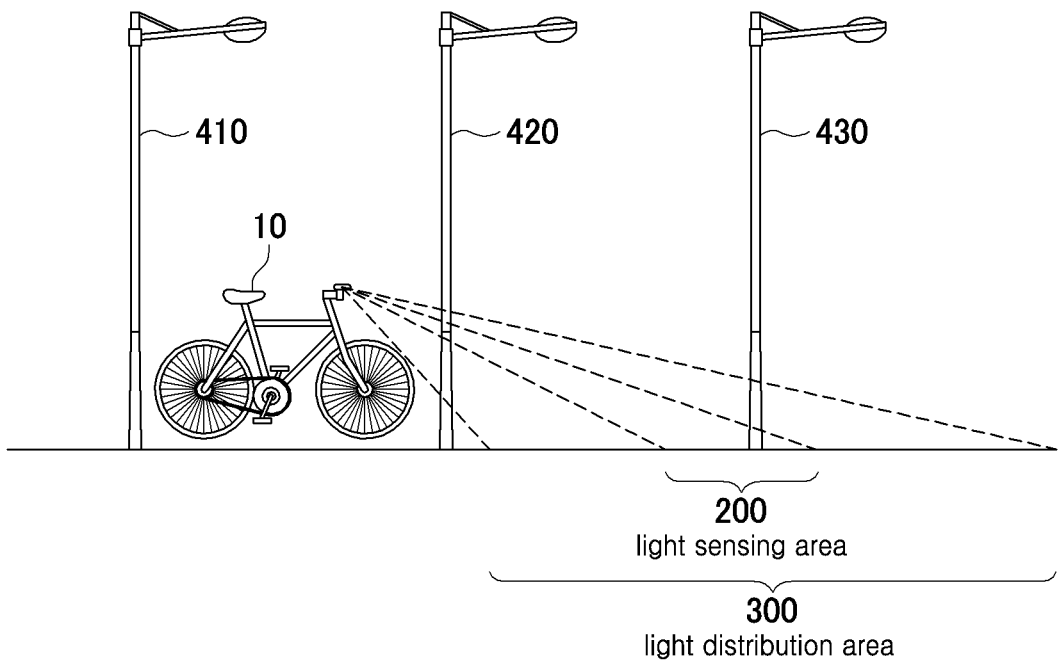
FIG. 8 and FIG. 9 are conceptual diagrams provided to explain the placement of a light output region and a brightness recognition region according to an embodiment of the present disclosure.
Figure 9:
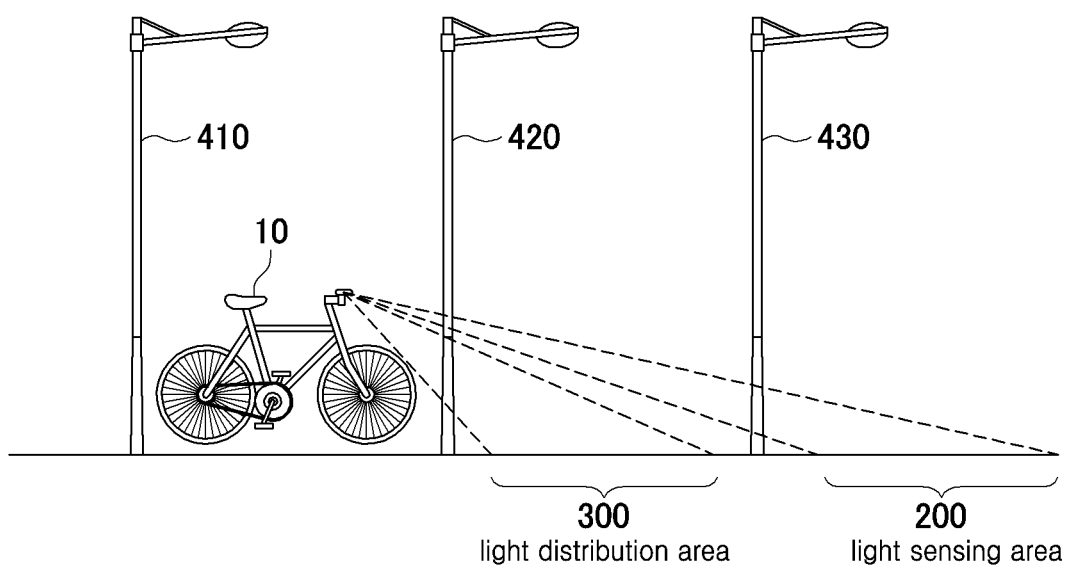

Meanwhile, the brightness sensing unit 120 can measure the luminance in two ways. As shown in FIG. 8, a recognition region 200 in front from which the brightness sensing unit 120 recognizes light and a light output region 300 to which the light irradiation unit 110 irradiates light may be overlapped with each other. Also, as shown in FIG. 9, the recognition region 200 in front from which the brightness sensing unit 120 recognizes light may be placed farther from the lighting device 100 than the light output region 300 to which the light irradiation unit 110 irradiates light.

If the recognition region 200 and the light output region 300 are overlapped with each other, light around the current position is recognized and light is output, and, thus, there is no directionality. Therefore, the lighting device 100 may be installed on both side surfaces or on the front and back. Also, since the recognition region 200 and the light output region 300 are overlapped with each other, an error in responding at an appropriate brightness may be reduced. Further, there is no need to differentiate the timing of the recognition region 200 from the timing of the light output region 300 depending on the movement speed. However, only the PWM control method among the two control methods of the control unit 130 can be used and the luminance in an OFF pulse period needs to be precisely measured, which may increase the level of difficulty in implementation.

If the recognition region 200 and the light output region 300 are different from each other, the luminance of a position in front of the current position is recognized. Thus, the brightness of a next region to reach is immediately recognized to control the amount of light of the lighting device 100. Therefore, this method is very useful for the user when moving in a means of transportation. In this case, both the PWM method and the method for controlling the intensity of light can be used. This is because the recognition region 200 and the light output region 300 are different from each other, and, thus, the brightness sensing unit 120 just needs to continue recognizing the brightness and the light irradiation unit 110 just needs to continue irradiating light. However, they can be used only when they are mounted on a means of transportation such as a bicycle which can move forward at a high speed and recognition region 200 and the light output region 300 are different from each other, which may cause an error in responding at an appropriate brightness. Also, there is a need to differentiate the timing of recognition from the timing of light output depending on the movement speed.

Meanwhile, the lighting device 100 according to an embodiment of the present disclosure further includes the communication unit 140 that performs local area communication with another device. The communication unit 140 may perform local area communication through a wired or wireless network.

As an additional function, the control unit 130 may control the light irradiation unit 110 to irradiate light when a signal indicating that a predetermined device has been recognized at a short range is received from the communication unit 140. For example, if the lighting device 100 is mounted on a bicycle, the light irradiation unit 110 of the lighting device 100 may irradiate welcome light when the user gets near to the bicycle to use it.

Further, as an additional function, the lighting device 100 may be paired with the user device to perform various functions. Specifically, the user device may be previously installed with an application that can be paired with the lighting device 100 to input settings, and the user may input estimated driving time information into the application. The control unit 130 may collect the estimated driving time information of the user from the user device through the communication unit 140 and then control the amount of light to be irradiated by the light irradiation unit 110 depending on remaining power and the estimated driving time information. For example, if the user is about to ride a bicycle only for 30 minutes, the control unit 130 may check remaining power and then perform an adaptive brightness control for 30 minutes. In this case, the control unit 130 may set a maximum brightness and a minimum brightness differently depending on the remaining power.

The lighting device 100 according to an embodiment of the present disclosure can be mounted on a bicycle or other mobilities and can be used during mountain climbing. To this end, the lighting device 100 may further include a detachable unit (not shown) configured to be detachable from the user's body or a separate means of transportation.

Figure 10:
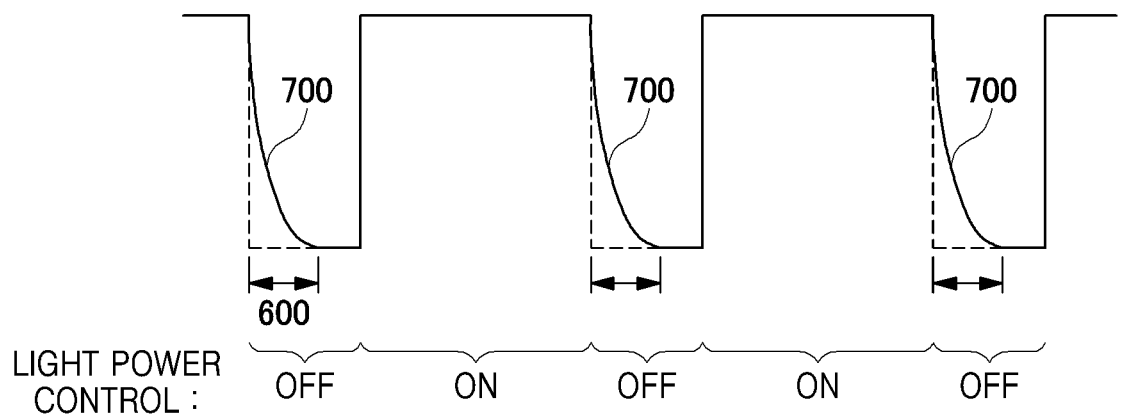
FIG. 10 is a graph of a PWM signal with consideration of an OFF delay time according to an embodiment of the present disclosure.

FIG. 10 is a graph showing an OFF delay time of light irradiation unit 110 and sensing timing of the brightness sensing unit 120 according to yet another embodiment of the present disclosure. Desirably, the control unit 130 may be turned on at a dimming delay time when the light irradiation unit 110 is turned off. In other words, the brightness sensing unit 120 may sense a target region immediately after a delay time 600 that is the point of time when an OFF delay time elapses. Meanwhile, the light irradiation unit 110 has the delay time 600 for gradually dimming light instantaneously when turned off as defined by a dimming curve 700. The control unit 130 may delay a turning ON timing by as much as the delay time 600 while controlling an ON/OFF frequency. Since supply of battery power is stopped during the delay time 600, the waste of energy can be minimized.

Further, in an additional embodiment of the present disclosure, the light irradiation unit 110 may include an irradiation angle adjusting unit (not shown) that can adjust an irradiation range. The irradiation angle adjusting unit may be controlled automatically by the control unit 130 or may be controlled manually by the user. When an irradiation angle decreases, the amount of light decreases, which results in battery saving.

Figure 11:
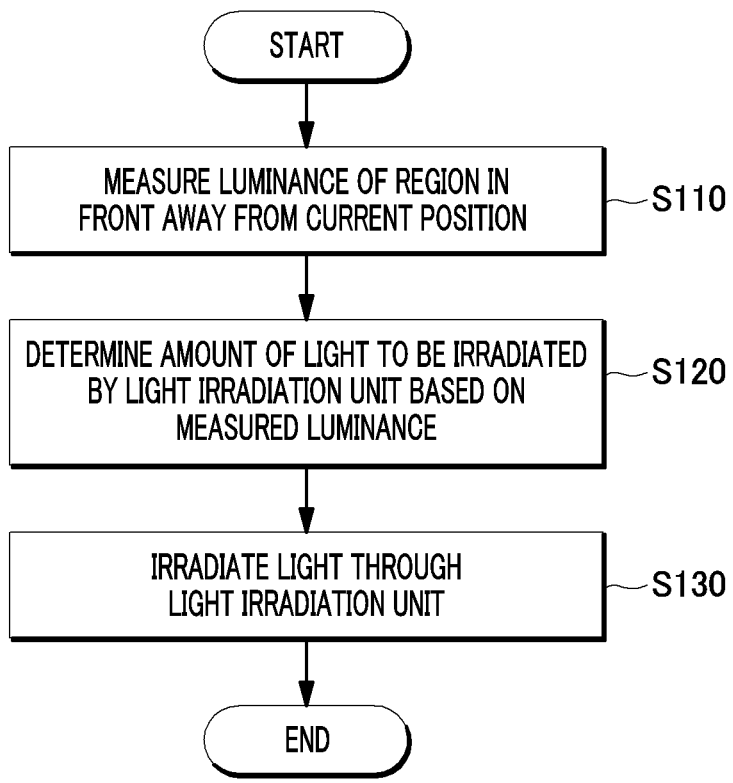
FIG. 11 is a flowchart showing a method for adaptively controlling the brightness of the lighting device according to an embodiment of the present disclosure.

Hereinafter, a method for adaptively controlling the brightness of the lighting device 100 according to an embodiment of the present disclosure will be described in detail with reference to FIG. 11. Even if a description is omitted below, since the method is performed by the above-described lighting device 100, a detailed description will be omitted.

First, the lighting device 100 measures the brightness of a region in front of a current position at a predetermined distance through the brightness sensing unit 120 (S110).

The lighting device 100 determines the amount of light to be irradiated by the light irradiation unit 110 of the lighting device 100 depending on the measured brightness (S120). Here, the measured brightness may be a luminance value.

The lighting device 100 may irradiate light by controlling the light irradiation unit 110 depending on the determined amount of light (S130). Here, the light irradiation unit 110 may control the amount of light by changing the width of an ON pulse period in which the light irradiation unit 110 is operated within a discrete signal controlling the light irradiation unit 110 or by changing the intensity of light in response to a continuous signal controlling the light irradiation unit 110.

Then, the processes of S110 to S130 can be repeated for each predetermined time unit (e.g., 100 ms).

Figure 12:
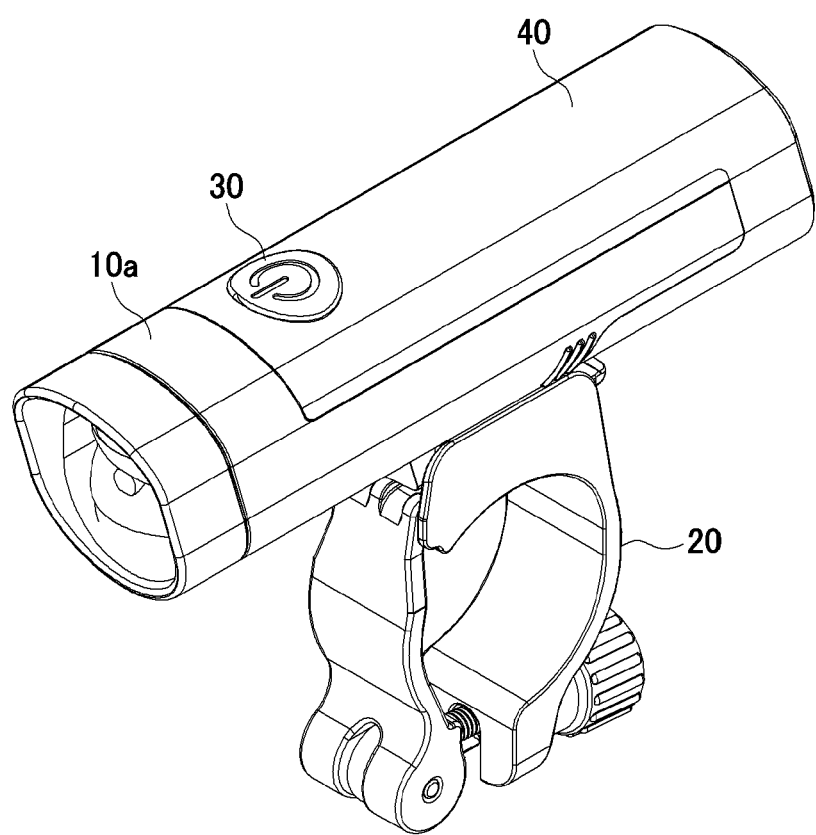
FIG. 12 is an overall perspective view illustrating a portable lighting device according to another embodiment of the present disclosure.

Referring to FIG. 12, a portable lighting device 1 according to another embodiment of the present disclosure may be composed of a main body case 10a, a fixing unit 20, a power button 30 and an upper case 40.

The main body case 10a of the portable lighting device 1 may have a hollow cylinder shape, and an upper end of the main body case 10a is partially opened in a backward direction of the portable lighting device 1. Also, a lower surface of the main body case 10a may be configured to be combined with a case fixing unit of the fixing unit.

Figure 14A:
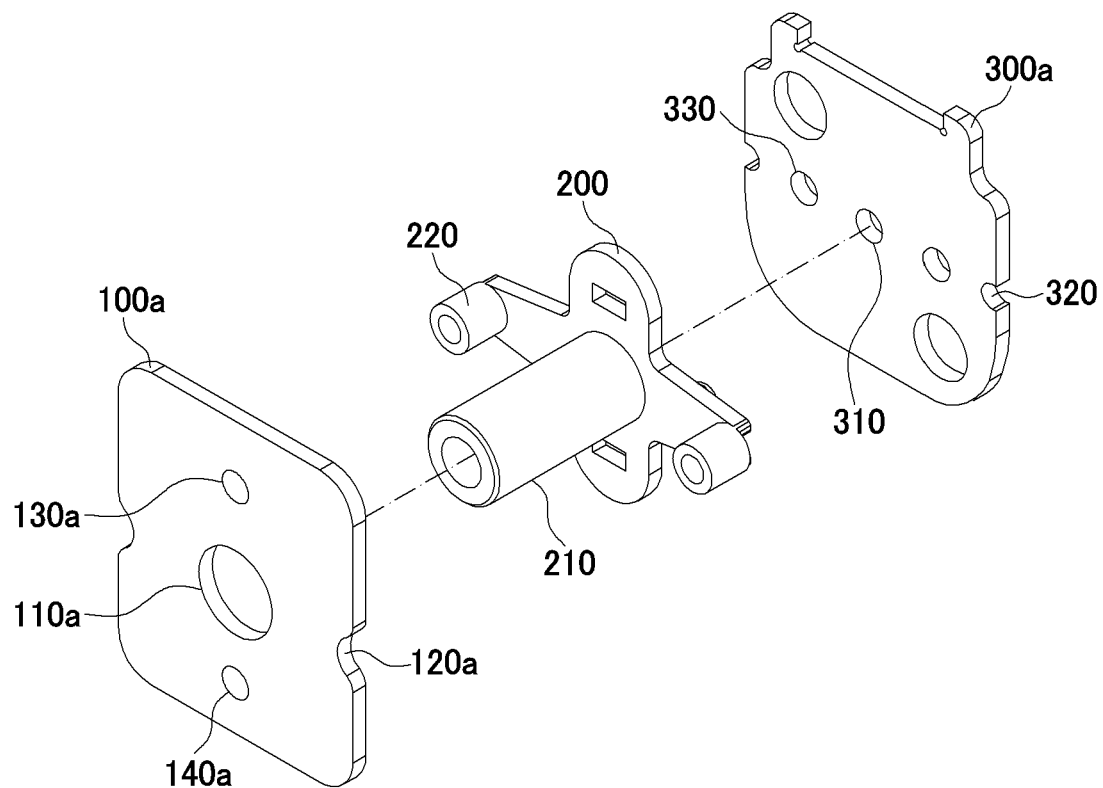
FIG. 14A is an assembly perspective view illustrating a light source unit, a pinhole unit and a sensor unit of the portable lighting device according to another embodiment of the present disclosure.
Figure 14B:
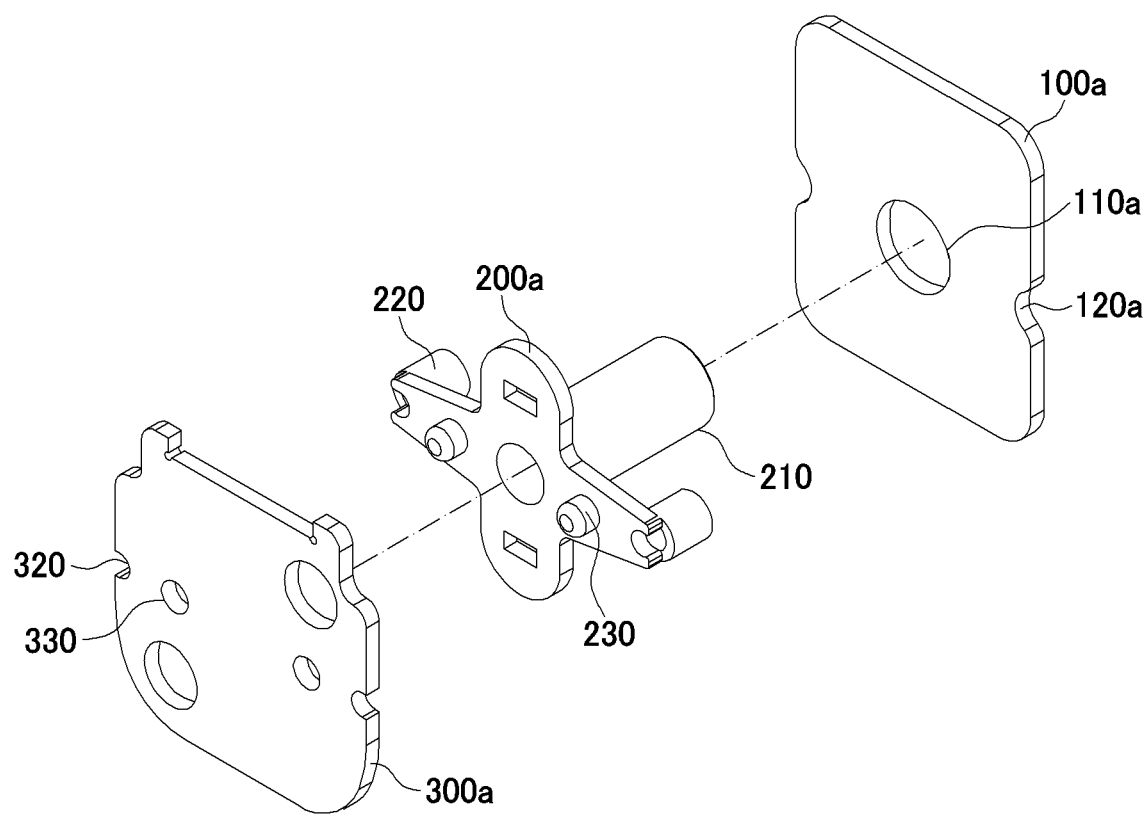
FIG. 14B is an assembly perspective view when viewed from the back of the light source unit, the pinhole unit and the sensor unit of the portable lighting device according to another embodiment of the present disclosure.

Through the opened upper end of the main body case 10a, a light source unit 100a, a pinhole unit 200a, a sensor unit 300a and a control unit (not shown) may be inserted into and installed in the main body case 10a, and the light source unit 100a, the pinhole unit 200a and the sensor unit 300a will be described in detail with reference to FIG. 14A and FIG. 14B.

The fixing unit 20 capable of fixing the portable lighting device 1 is composed of a case fixing unit 21 combined with the lower surface of the main body case 10a and a device fixing unit 22 capable of fixing the portable lighting device 1 in a device including a mobility or in a space. The device fixing unit 22 is illustrated as having a clamp shape in the drawings, but the fixing unit 20 may be changed in shape depending on the fixing method. The method and shape of fixing by the fixing unit 20 are not limited thereto.

An operation of the portable lighting device 1 may be controlled through the power button 30, and a light source may be turned on or off. Also, an operation of the light source that irradiates light may be changed depending on the number of times of pushing the power button 30. For example, if the power button 30 is pushed once, the light source can be turned on, and if the power button 30 is pushed twice, the light source can be repeatedly turned on and off for a predetermined period of time. If the power button 30 is pushed three times, the light source can be turned on and off for a shorter period of time than when the power button 30 is pushed twice. The above-described example is just an example, but does not limit the operation of the light source depending on the number of times of pushing.

Figure 13:
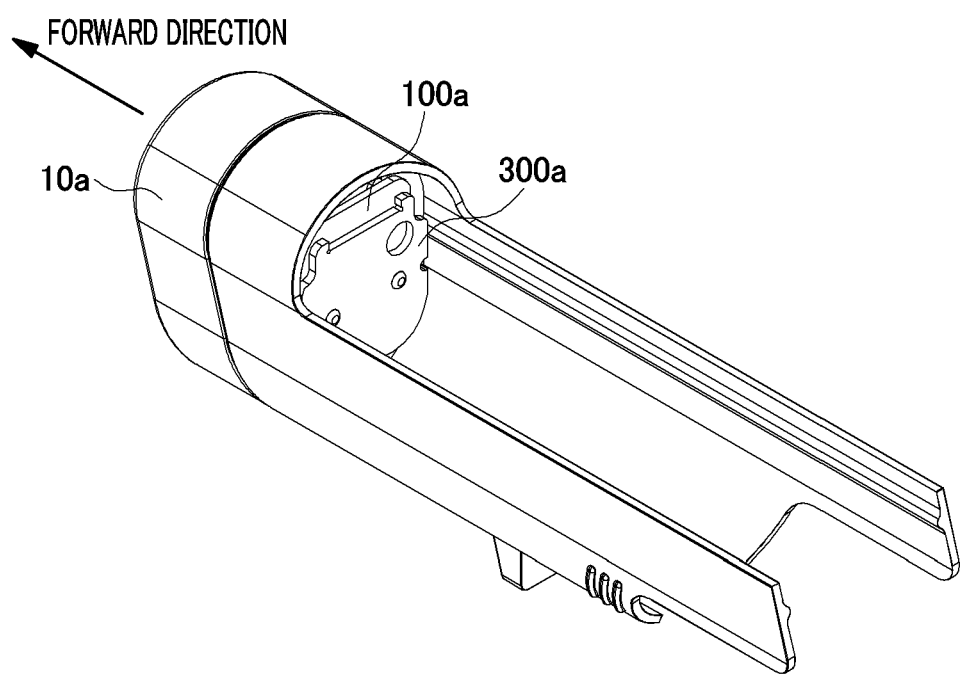
FIG. 13 is a perspective view when viewed from the back of a main body case of the portable lighting device according to another embodiment of the present disclosure.

Referring to FIG. 13, the positions of the light source unit 100a, the pinhole unit 200a and the sensor unit 300a assembled inside the main body case 10a according to another embodiment of the present disclosure will be described in detail.

The fronts of the light source unit 100a, the pinhole unit 200a and the sensor unit 300a arranged inside the main body case 10a are all placed in a forward direction.

The light source unit 100a, the pinhole unit 200a and the sensor unit 300a are combined sequentially and arranged inside the main body case 10a, and will be described in detail with reference to FIG. 14A and FIG. 14B.

The shape and structure of each of the light source unit 100a, the pinhole unit 200a and the sensor unit 300a will be described in detail with reference to FIG. 14A and FIG. 14B.

The light source unit 100a may be formed into a plate shape. The light source unit 100a includes a light source unit center hole 110a corresponding in size to a pinhole 210 and penetrating the center thereof, and light source unit fixing grooves 120a corresponding in size to pinhole unit fixing pins 220 at the centers of both side parts, respectively.

Further, an upward light source 130a may be placed on the upper side with respect to the light source unit center hole 110a and a downward light source 140a may be placed on the lower side. Here, the upward light source 130a and the downward light source 140a may be light sources, such as LEDs, that emit light.

The pinhole unit 200a is formed into a plate shape and includes the pinhole 210 penetrating the center of the plate and having a hollow cylinder shape. Here, in order to fix the centermost pinhole unit 200a to the light source unit 100a, the sensor unit 300a and a lens unit 400, the pinhole unit fixing pins 220 each having a hollow cylinder shape are formed at both side parts, and a screw thread may be formed inside each of the pinhole unit fixing pins 220. The pinhole unit fixing pins 220 may be clamped by screws to be fixed to the light source unit 100a, the pinhole unit 200a, the sensor unit 300a and the lens unit 400.

The pinhole unit 200a includes a plurality of back fixing pins 230 protruding from a back surface so as to be combined with the sensor unit 300a at fixed positions.

The sensor unit 300a is formed into a plate shape and may be equipped with an illuminance sensor at a position corresponding to the center of the pinhole 210 of the pinhole unit 200a. Also, sensor unit fixing pin grooves 320 corresponding in position to the pinhole unit fixing pins 220 may be formed at the centers of both side surfaces, respectively.

Further, the sensor unit 300a includes a sensor unit back hole 330 corresponding in position to the back fixing pin 230 of the pinhole unit 200a and thus can be fixed to and combined with the pinhole unit 200a.

The sensor unit 300a and the pinhole unit 200a may be assembled such that the pinhole unit 200a is arranged on the front of the sensor unit 300a. The back fixing pin 230 of the pinhole unit 200a is inserted into the sensor unit back hole 330 and located at a fixed position in order for an illuminance sensor 310 at the center of the sensor unit 300a to be located at a position corresponding to the center of the pinhole 210 of the pinhole unit 200a.

The illuminance sensor 310 installed in the sensor unit 300a of the portable lighting device 1 is a typical sensor for measuring the illuminance and is configured to measure the brightness of a current position. In the present disclosure, the illuminance sensor 310 is located at the center of the pinhole 210 and thus can measure the brightness of a region in front at a predetermined distance without interference of ambient noise light.

The light source unit 100a may be arranged and assembled on the front of the combination of the pinhole unit 200a and the sensor unit 300a. The light source unit 100a, the pinhole unit 200a and the sensor unit 300a need to be assembled sequentially in order for the sensor unit 300a to avoid interference of the light source and only when the light source is located on the very front of the assembly, the light source can irradiate light forward.

The pinhole 210 of the pinhole unit 200a is inserted into the light source unit center hole 110a of the light source unit 100a and the pinhole unit fixing pins 220 are inserted into the light source unit fixing grooves 120a formed at the centers of the both side parts of light source unit 100a to assemble the light source unit 100a, the pinhole unit 200a and the sensor unit 300a.

Figure 15:
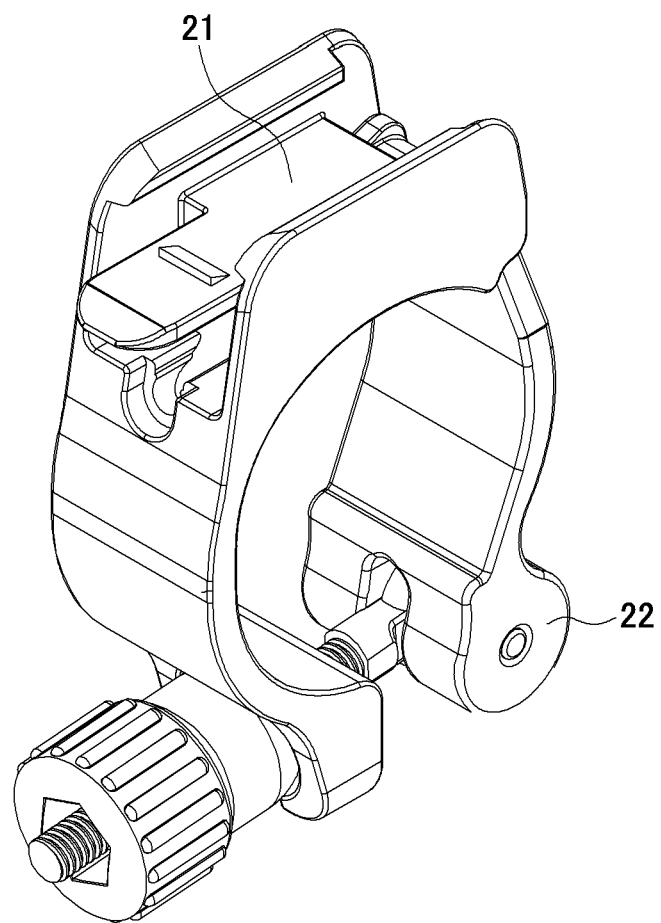
FIG. 15 is a perspective view illustrating a fixing unit of the portable lighting device according to another embodiment of the present disclosure.

Referring to FIG. 15, the fixing unit of the portable lighting device 1 according to another embodiment of the present disclosure will be described.

The fixing unit may be composed of a case fixing unit 21 fixed to the lower surface of the main body case 10a in a hook manner and a device fixing unit 22 for fixing the portable lighting device 1 in a mobility at a predetermined position.

The device fixing unit 22 is illustrated as having a clamp shape in the drawings, but may be changed depending on the environment such as purpose, shape or position for fixing. The shape of the device fixing unit 22 is not limited thereto.

In an additional embodiment, the fixing unit 20 may be formed into a magnet or a belt. Also, the fixing unit 20 may be fixed easily at a desired position using a band or may be fixed to a helmet or an arm, and, thus, the light source of the portable lighting device 1 can irradiate light forward.

Figure 16:
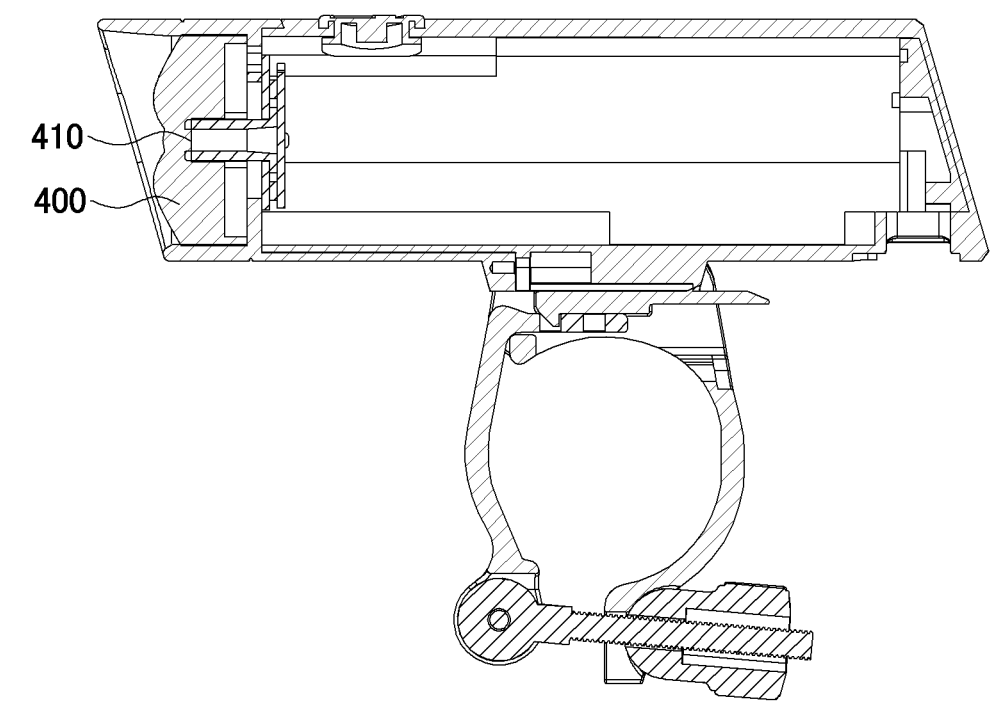
FIG. 16 is a half sectional view illustrating the portable lighting device according to another embodiment of the present disclosure.

Referring to FIG. 16, the lens unit 400 of the portable lighting device 1 according to another embodiment of the present disclosure will be described.

FIG. 16 is a half sectional view illustrating the portable lighting device 1 and shows the placement and assembly relationship of the components inside the portable lighting device 1 according to another embodiment of the present disclosure. Here, the lens unit 400 may be placed on the front of the pinhole 210 of the pinhole unit 200a inside the main body case 10a. The lens unit 400 may be equipped with a condensing lens 411 configured to amplify and intensively collect light generated in front thereof.

Also, the lens unit 400 may be placed between a plurality of light sources in order to precisely collect light without interference from the light sources of the light source unit 100a. For example, the lens unit 400 may be placed in the middle of positions corresponding to the upward light source 130a and the downward light source 140a in the same manner as the upward light source 130a and the downward light source 140a in the light source unit 100a.

An operation of the portable lighting device 1 according to another embodiment of the present disclosure will be described with reference to FIG. 17.

Figure 17:
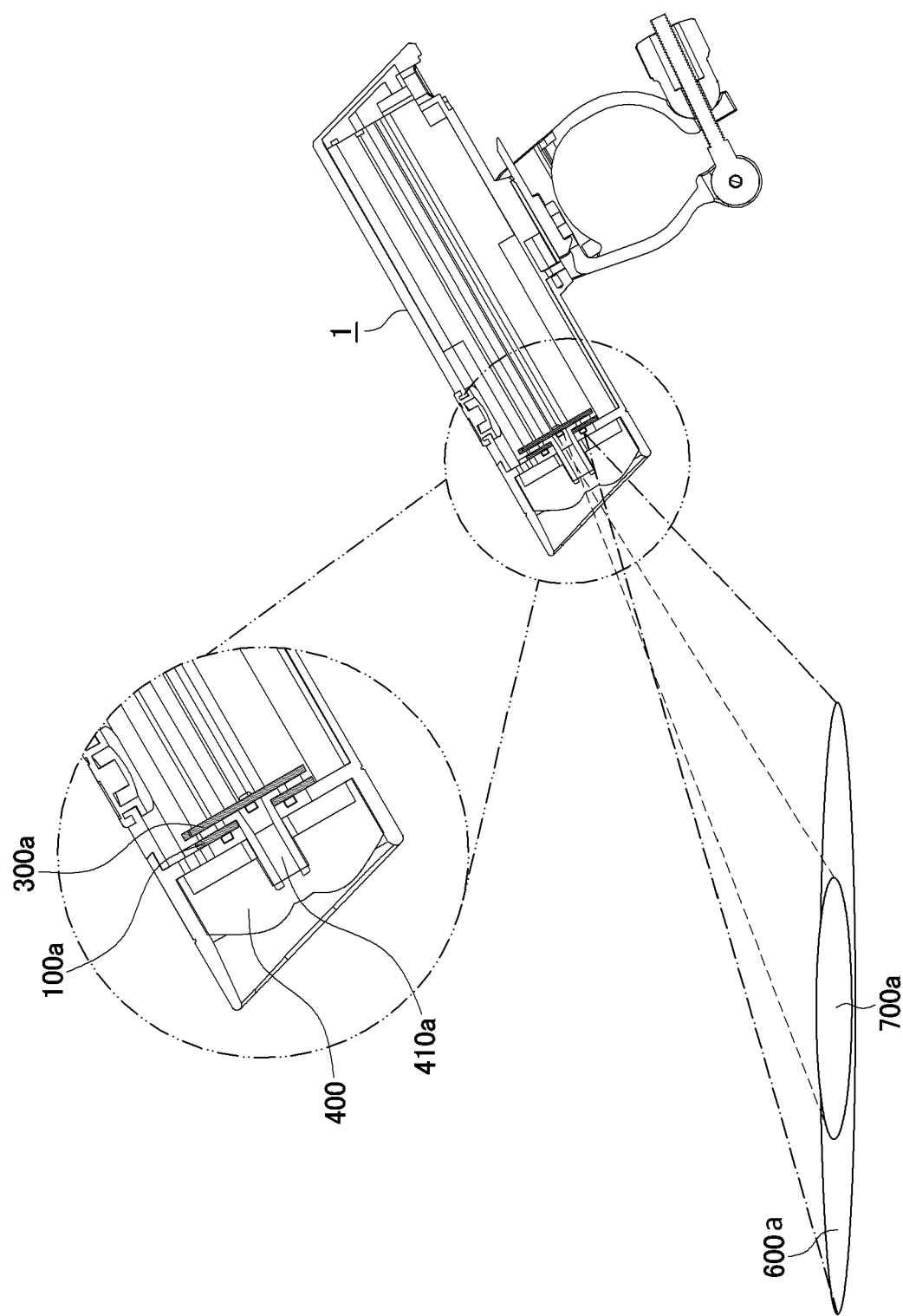
FIG. 17 is an illustration showing an operation of the portable lighting device according to another embodiment of the present disclosure.

Referring to FIG. 17, when the portable lighting device 1 is operated, the light source unit 100a irradiates light to a region in front to form a light output region 600a, and the illuminance sensor 310 for measuring light may measure the luminance of light in a light measurement region 700a formed in a region in front through the pinhole 210 and overlapped with the light output region 600a.

In general, the illuminance sensor 310 measures the illuminance that is the brightness of a light source, but in the present disclosure, the illuminance sensor 310 is placed at a position corresponding to the center of the pinhole 210, and, thus, light interference does not occur around the illuminance sensor 310. Further, light does not exist except for in the light measurement region 700a formed in a region in front through the pinhole 210, and, thus, the amount of light which can be seen through the pinhole 210 can be measured.

The condensing lens 411 may be placed to amplify and intensively collect light generated in front of the pinhole 210 if the amount of light is not sufficient when the amount of light is measured.

The illuminance sensor 310 may measure the luminance of the collected light and adjust the brightness of light irradiated forward depending on the measured luminance.

For example, if street lamps are installed at a predetermined distance from each other, it is not bright throughout the entire region, but it is the brightest right under the street lamps and the darkest between the street lamps. Here, if the portable lighting device 1 according to another embodiment of the present disclosure is used, the brightness of light to be irradiated is increased in a dark place and decreased in a bright place depending on the amount of the collected light. Thus, it is possible to save a battery (not shown) placed inside the portable lighting device 1.

In an additional embodiment, the portable lighting device according to another embodiment of the present disclosure can be used in mobilities including a bicycle or a scooter and can be carried on during mountain climbing. Also, the portable lighting device can be used in a head-mounted lantern or the like. Further, the portable lighting device can be used as a lighting device fixed at a specific position. For example, as a screen bar mounted on a monitor of a typical desktop, the portable lighting device capable of adjusting the brightness around the desktop depending on the brightness of the surrounding environment can be used. If someone works alone in an office, he/she may turn off lights of the office to save power and use a screen bar, which is one of the additional embodiments of the present disclosure, to measure and adjust the brightness around a desk where he/she works.

The control unit 130 and the brightness sensing unit 120 according to an embodiment of the present disclosure may include a memory in which a program is stored and a processor for executing the program. The embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single a can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

100: Lighting device
110: Light irradiation unit
120: Brightness sensing unit
130: Control unit 140: Communication unit
150: Speed sensing unit

What is claimed is:

1. A portable lighting device capable of adaptive brightness control, comprising:
a light irradiation unit that irradiates light;
a brightness sensing unit that measures brightness of a region in front of a current position at a predetermined distance; and
a control unit that controls an amount of light to be irradiated by the light irradiation unit depending on the brightness measured by the brightness sensing unit,
wherein the control unit performs a control based on pulse width modulation (PWM) and controls the brightness sensing unit to measure the brightness in an OFF pulse period when an OFF delay time elapses after the light irradiation unit turns off, and controls the amount of light by changing the width of the ON pulse period in which the light irradiation unit is operated within a discrete signal controlling the light irradiation unit,
wherein the brightness sensing unit has a structure including a hole part that collects light generated in front thereof to measure luminance representing the amount of light reflected from a target surface and a passage extending from the hole part and configured to filter noise light from the generated light and collect long-range light at a wide angle by means of a lens,
wherein a recognition region in front from which the brightness sensing unit recognizes light and a light output region to which the light irradiation unit irradiates light are overlapped with each other,
wherein the timing of recognizing light from the recognition region and the timing of irradiating light to the light output region remain the same regardless of a movement speed,
wherein the lighting device reduces the amount of light as the measured brightness increases and increases the amount of light as the measured brightness decreases to control the brightness to be maintained in a predetermined range, and
wherein the control unit performs a control to measure the brightness for each OFF pulse period and determines a pulse width of a next ON pulse period depending on the measured brightness.

2. The portable lighting device capable of adaptive brightness control of claim 1,
wherein the control unit controls a frequency of a control signal based on a PWM to be higher than a frequency which is recognizable by a human.

3. The portable lighting device capable of adaptive brightness control of claim 1, further comprising:
a detachable unit that is detachable from a user's body or a separate means of transportation.

4. The portable lighting device capable of adaptive brightness control of claim 1,
wherein the control unit collects estimated driving time information of a user from a user device and then controls the amount of light from the light irradiation unit depending on remaining power and the estimated driving time information.

5. The portable lighting device capable of adaptive brightness control of claim 1, wherein the brightness sensing unit is formed into a plate shape and includes a pinhole penetrating a center of the plate and having a hollow cylinder shape.

6. The portable lighting device capable of adaptive brightness control of claim 1, wherein the passage has a shape of drinking straw.

* * * * *